(12) United States Patent
Volokh et al.

(10) Patent No.: US 8,647,023 B2
(45) Date of Patent: Feb. 11, 2014

(54) CLAMPING MECHANISM FOR SLOTTING CUTTER

(75) Inventors: Vladimir David Volokh, Maalot (IL); James Michael Waggle, Derry, PA (US)

(73) Assignee: Kennametal Inc., Latrobe, PA (US)

( * ) Notice: Subject to any disclaimer, the term of this patent is extended or adjusted under 35 U.S.C. 154(b) by 218 days.

(21) Appl. No.: 13/079,353

(22) Filed: Apr. 4, 2011
(Under 37 CFR 1.47)

(65) Prior Publication Data

US 2012/0251251 A1  Oct. 4, 2012

(51) Int. Cl.
*B23C 5/22* (2006.01)

(52) U.S. Cl.
USPC .............................................. 407/41; 407/50

(58) Field of Classification Search
USPC ................... 407/50, 49, 41, 47, 109, 110
See application file for complete search history.

(56) References Cited

U.S. PATENT DOCUMENTS

| | | | | |
|---|---|---|---|---|
| 447,900 A | * | 3/1891 | Pallen | 407/45 |
| 534,220 A | * | 2/1895 | Kent | 407/43 |
| 867,275 A | * | 10/1907 | Hunter | 407/45 |
| 899,608 A | * | 9/1908 | Newbold | 407/8 |
| 1,391,097 A | * | 9/1921 | Cowles | 407/40 |
| 2,331,555 A | | 10/1943 | Jostich, Jr. et al. | |
| 2,353,913 A | | 7/1944 | Luers | |
| 2,485,324 A | | 10/1949 | Sheldrick | |
| 2,810,189 A | * | 10/1957 | See et al. | 407/31 |
| 3,058,198 A | | 10/1962 | Williams | |
| 3,123,896 A | | 3/1964 | Wilson, Jr. | |
| 4,092,082 A | * | 5/1978 | Severson | 407/40 |
| 4,097,174 A | * | 6/1978 | Heinlein | 407/46 |
| 4,357,123 A | * | 11/1982 | Zweekly | 407/110 |
| 4,363,576 A | * | 12/1982 | Zweekly | 407/50 |
| 5,411,354 A | | 5/1995 | Gustafsson | |
| 5,647,699 A | * | 7/1997 | Martin et al. | 407/33 |
| 5,820,309 A | * | 10/1998 | Mihic | 407/50 |
| 5,833,403 A | | 11/1998 | Barazani | |
| 6,139,227 A | * | 10/2000 | Schafer et al. | 407/110 |
| 6,902,357 B2 | * | 6/2005 | Blessing et al. | 408/204 |
| 7,246,974 B2 | | 7/2007 | Hansson et al. | |
| 2011/0182678 A1 | * | 7/2011 | Waggle et al. | 407/49 |

FOREIGN PATENT DOCUMENTS

| JP | 2007-245245 A | * | 9/2007 | B23C 5/22 |
|---|---|---|---|---|
| JP | 2008-137117 A | * | 6/2008 | B23C 5/22 |

* cited by examiner

*Primary Examiner* — Daniel Howell
*Assistant Examiner* — Ryan Rufo
(74) *Attorney, Agent, or Firm* — Larry R. Meenan, Esq.

(57) ABSTRACT

A slotting cutter includes a disc-like cutter body rotatable in a predetermined direction on a central axis perpendicular to a plane of the cutter body. A plurality of cutting insert receiving pockets and a corresponding number of thread holes are formed about a perimeter of the body. A cutting insert is replaceably mounted in each insert receiving pocket of the cutter body, and a clamping screw is replaceably threaded in each thread hole of the cutter body. A cantilevered portion is disposed between each insert receiving pocket and a respective thread hole that exerts a downward force to securely hold the cutting insert in the cutter body when the clamping screw is threaded into the thread hole.

10 Claims, 4 Drawing Sheets

CLAMPING MECHANISM FOR SLOTTING CUTTER

BACKGROUND OF THE INVENTION

Slotting cutters are known for cutting keyways and the like and, also, for providing work members with slots of various width.

Slotting cutters are somewhat similar to milling cutters in that the cutter usually employs a disc-like member having cutting inserts mounted in the periphery thereof. In a milling cutter, the cutting inserts are generally presented axially, whereas, in a slotting cutter, the cutting inserts protrude radially from the supporting disc and are, thus, presented to the work in the radial direction.

In order to form slots rapidly and efficiently, it is desirable that the cutting inserts be solidly supported in the cutter body and have adequate clearance between the cutting edges of the inserts and the cutter body as the material is removed from the work piece. With the inserts solidly supported and having sufficient clearance between the cutter body and the cutting edges, the slotting cutter is able to withstand substantial loads and can cut extremely rapidly, freely and accurately.

Most slotting cutters clamp the insert in the cutter body by means of an insert pocket with a "saw-cut" clamp design, and an insert with a slight taper angle. This "saw-cut" design allows for the insert pocket area to spread open when the insert is seated, which creates a spring-type taper clamping effect on the insert. In order for the slotting cutter to have minimal radial run-out, an additional seating surface feature is usually added to the pocket area. This seating surface creates a positive stop, which minimizes the accumulated radial run-out that could exist without this feature. This seating surface also distributes the radial cutting forces into the slotting cutter body, which in turn keeps the insert pocket from spreading open even further.

The existing pocket designs are completely dependent on the spring ability of the cutter body to securely clamp the insert, and does not allow for pocket wear or manufacturing dimensional variations of the insert and pocket.

SUMMARY OF THE INVENTION

The problem of the inability to compensate for pocket wear or manufacturing dimensional variations of the insert and pocket to securely clamp the insert has been solved by providing a conical-shaped clamping screw or a clamping screw with a tapered head portion that causes a cantilevered portion of the cutter body to exert a downward force against a cutting insert when the clamping screw is threaded into a similarly-shaped thread hole in the cutter body.

In one aspect of the invention, a slotting cutter comprises a disc-like cutter body rotatable in a predetermined direction on a central axis perpendicular to a plane of the cutter body. A plurality of cutting insert receiving pockets are formed about a perimeter of the body. A plurality of thread holes are formed about the perimeter of the cutter body. A clamping screw is replaceably threaded in each conical thread hole of the cutter body. A cantilevered portion is disposed between each insert receiving pocket and a respective thread hole. When the clamping screw is threaded into the conical thread hole, the clamping screw causes the cantilevered portion to exert a biasing force against the cutting insert to securely hold the cutting insert in the insert receiving pocket.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
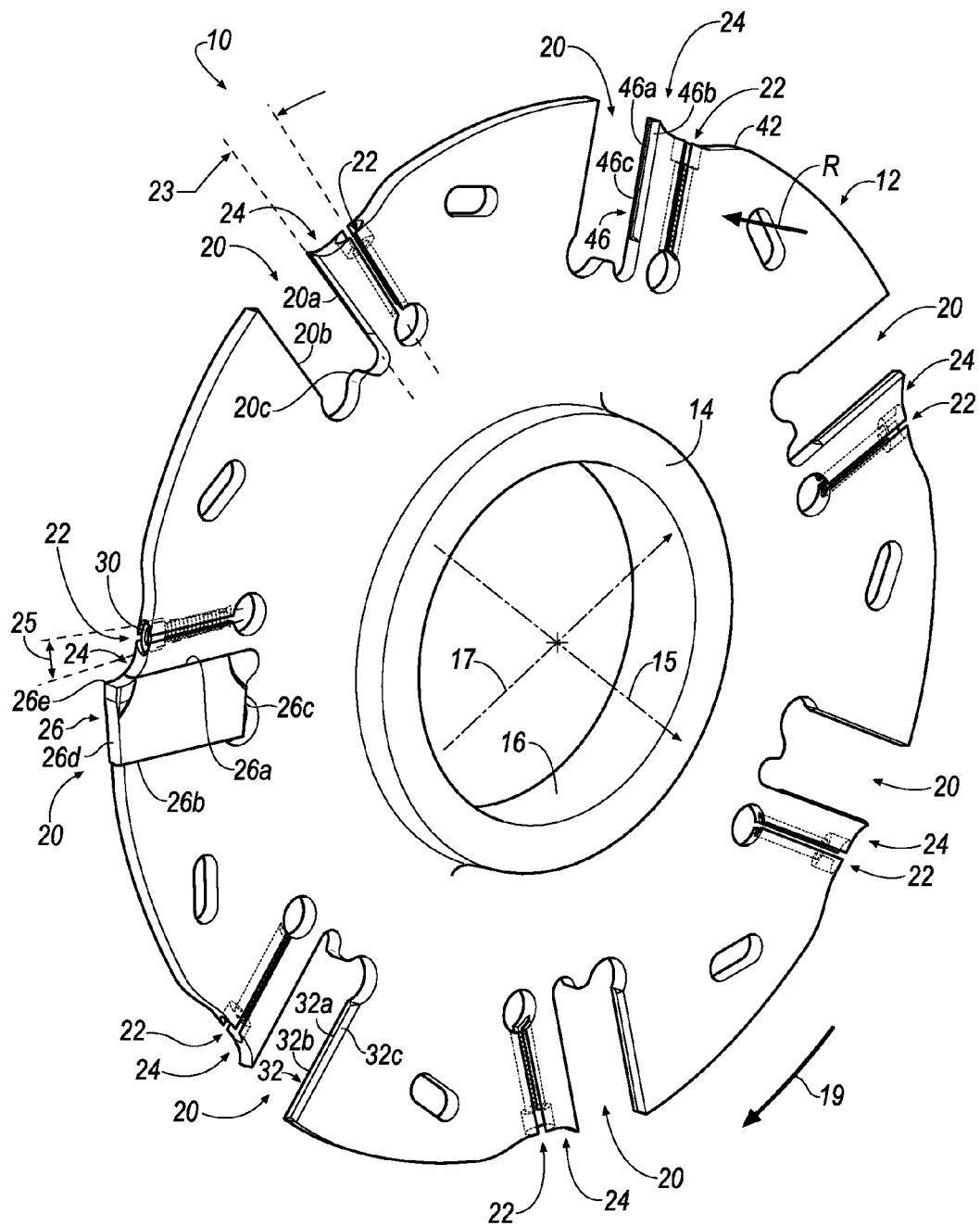
FIG. 1 is a perspective view of a slotting cutter with a plurality of conical thread holes according to an embodiment of the invention.
Figure 2:
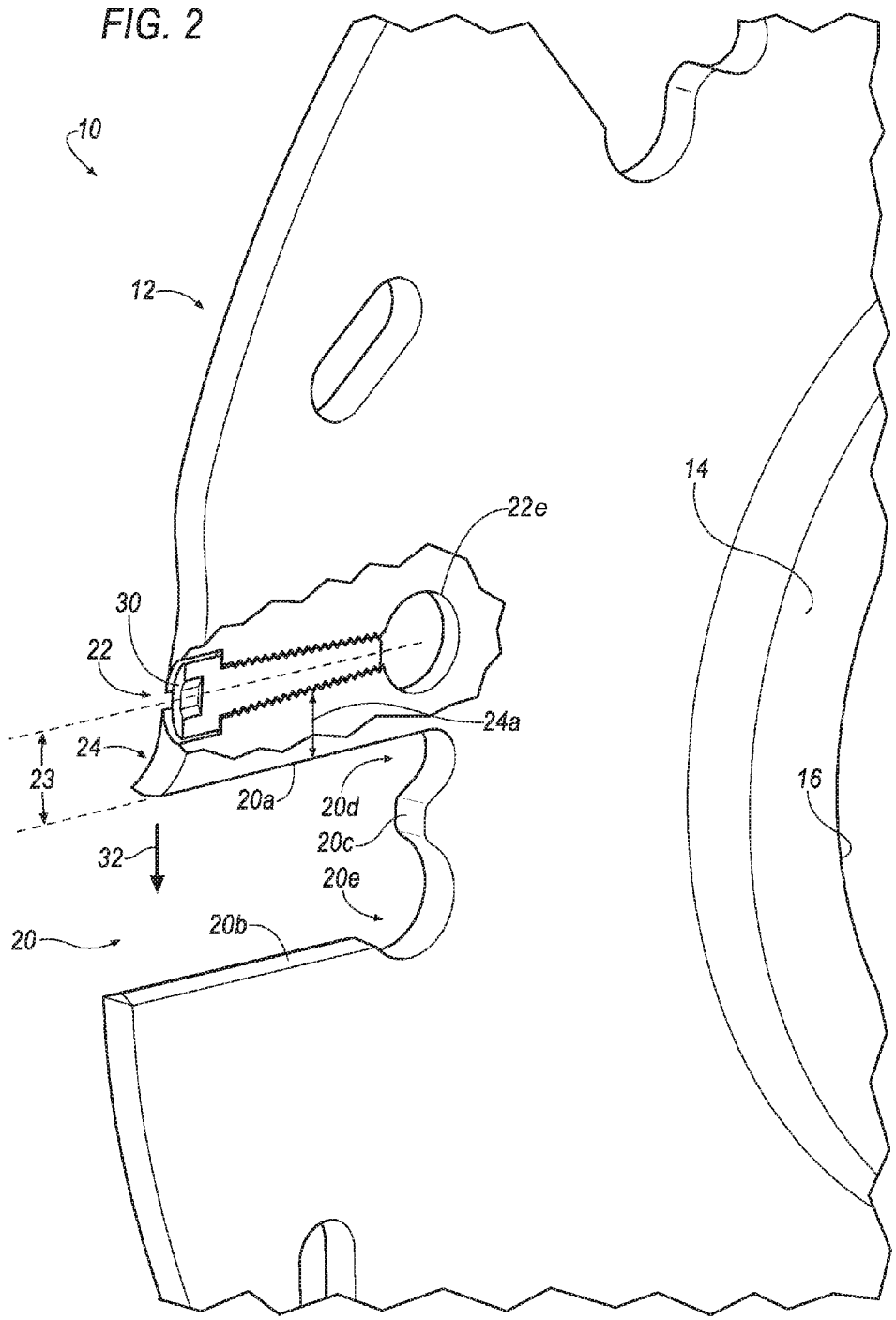
FIG. 2 is an enlarged partial perspective view side view of the conical thread hole, the insert receiving pocket and the cantilevered portion of the slotting cutter of FIG. 1.

Referring now to FIGS. 1 and 2, a slotting cutter 10 is shown according to an embodiment of the invention. The slotting cutter 10 includes a disc-like cutter body 12 having a central hub region 14 that is provided with a bore 16 for receiving a support shaft (not shown). The slotting cutter 10 rotates on a central axis 15 perpendicular to a plane 17 of the cutter body 12 in a predetermined direction (indicated by the arrow 19). The central hub region 14 may also be provided with an optional keyway for receiving a drive key (not shown).

In the illustrated embodiment, the slotting cutter 10 includes seven (7) pockets 20 equally spaced about the perimeter of the cutter body 12. However, it will be appreciated that the invention is not limited by the number of pockets 20, and that any suitable number of pockets 20 may be formed about the perimeter of the cutter body 12, depending on the desired material of the work piece to be cut and the physical dimensions of the cutter body 12.

The slotting cutter 10 is also provided with a plurality of conical thread holes 22 formed about the perimeter of the cutter body 12 for receiving a conical thread screw 30. Each conical thread hole 22 has threaded sidewalls 22a, 22b that are formed at a taper angle 25 with respect to each other. The taper angle 25 can be in the range between about one (1) degree and about twenty (20) degrees, and preferably in the range between about five (5) degrees and about fifteen (15) degrees, and most preferably between about five (5) degrees and about ten (10) degrees. In the illustrated embodiment, the taper angle 25 is about five (5) degrees. However, it will be appreciated that the invention is not limited by the degree of the angle 25, and that the invention can be practiced with any non-zero angle.

Figure 3:
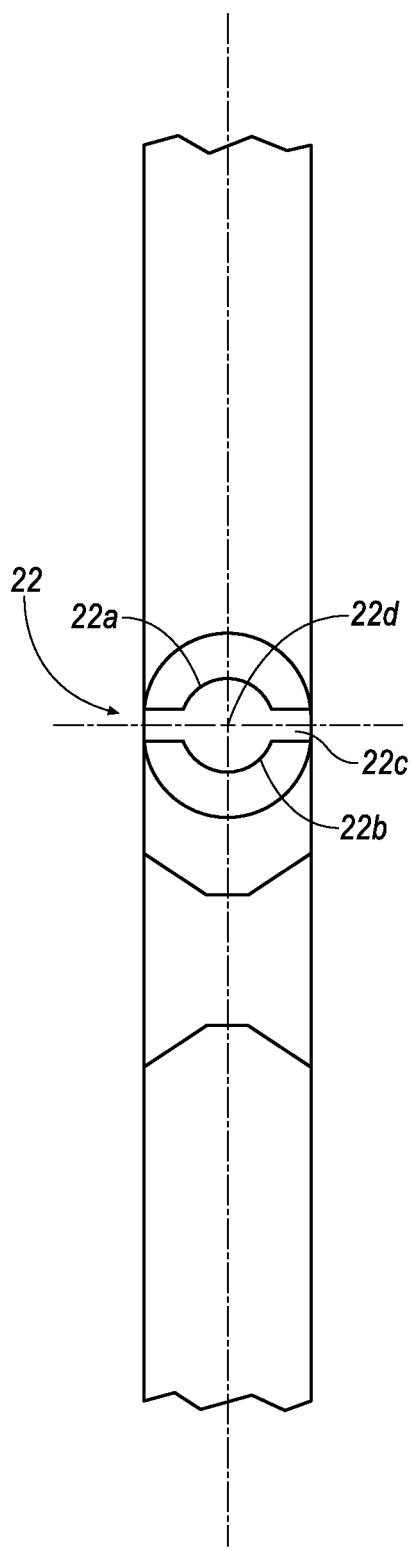
FIG. 3 is a front view of the conical thread hole showing the transverse slot according to allow the conical thread hole to expand and contract in a radial direction according to an aspect of the invention.

As shown in FIG. 3, each sidewall 22a, 22b is separated by a transverse slot 22c to allow the conical thread hole 22 to expand and contract in a radial direction with respect to a central axis 22d of the conical thread hole 22. The number of conical thread holes 22 corresponds to the number of insert receiving pockets 20. Each conical thread hole 22 is formed at an angle 23 with respect to a top wall 20a of its respective insert receiving pocket 20. The angle 23 can be in the range between about one (1) degree and about twenty (20) degrees, and preferably in the range between about five (5) degrees and about fifteen (15) degrees, and most preferably between about five (5) degrees and about ten (10) degrees. In the illustrated embodiment, the angle 23 is about five (5) degrees. However, it will be appreciated that the invention is not limited by the degree of the angle 23, and that the invention can be practiced with any non-zero angle between the conical thread hole 22 and the top wall 20a of the insert receiving pocket 20.

A cantilevered portion 24 of the cutter body 12 is formed between each conical thread hole 22 and a respective insert receiving pocket 20. In operation, the cantilevered portion 24 exerts a downward force against a cutting insert when the conical clamping screw 30 is threaded into the conical thread hole 22. An aperture 22e at one end of the conical thread hole 22 provides the flexibility needed for the cantilevered portion 24 to move in the downward direction when the conical clamping screw is threaded into the conical thread hole 22, and vice versa. It should be appreciated that the force exerted by the cantilevered portion 24 as a function of travel of the conical clamping screw 30 can be adjusted by changing the angle 23. For example, a relatively larger angle 23 between the conical thread hole 22 and the top wall 20a of the insert receiving pocket 20 will cause the conical clamping screw 30 to exert a greater amount force for the same amount of travel as compared to a relatively smaller angle 23.

As seen in FIG. 2, the cantilevered portion 24 has a substantially uniform thickness 24a along its entire length. The thickness 24a of the cantilevered portion 24 can be selectively adjusted to vary the amount of flexibility of the cantilevered portion 24. The amount of flexibility of the cantilevered portion 24 can be selectively adjusted by varying the thickness 24a. In another embodiment, the thickness 24a varies along the length of the cantilevered portion 24.

As shown in FIGS. 1 and 2, the slotting cutter 10 is provided with a plurality of cutting insert receiving pockets 20 formed about the perimeter of the cutter body 12. Each insert receiving pocket 20 includes a top wall 20a, an opposing bottom wall 20b, and a rear wall 20c. The insert receiving pocket 20 may also include a first radius 20d between the top wall 20a and the rear wall 20c, and a second radius 20e between the bottom wall 20b and the rear wall 20c. In one embodiment, the top wall 20a is substantially parallel to the bottom wall 20b. However, it will be appreciated that the invention is not limited by the relative angle between the top and bottom walls 20a, 20b, and that the invention can be practiced with the top and bottom walls 20a, 20b being non-parallel to each other. The rear wall 20c acts as a stop for the end walls 26c, 26d of the cutting insert 26 to prevent further inward radial movement of the cutting insert 26 when mounted in the insert receiving pocket 20. The bottom wall 20b is complementary in shape to at least one of the top and bottom walls 26a, 26b of the cutting insert 26. In the illustrated embodiment, the bottom wall 20b is complementary in shape to the bottom wall 26b of the cutting insert 26.

As shown in FIG. 1, a cutting insert 26 is replaceably mounted in each insert receiving pocket 20 of the cutter body 12 and a conical thread screw 22 is replaceably threaded into each conical thread hole 22 of the cutter body 12. Due to the downward force exerted by the cantilevered portion 24 when the conical thread screw 22 is threaded into the conical thread hole 22, the combination of the cantilevered portion 24 and the conical thread screw 22 comprises an insert clamping mechanism by which the cutting insert 26 is securely held in the cutter body 12.

In operation, the cutting insert 26 is inserted into the insert receiving pocket 20 and a conical clamping screw 30 is threaded into a respective conical thread hole 22. A well-known tool, such as an Allen wrench (not shown) can be used to thread the conical clamping screw 30 into its respective conical thread hole 22. As the conical clamping screw 30 moves radially inward, the taper angle 25 of the conical thread hole 22 causes the cantilevered portion 24 to be urged downwardly in the direction of the arrow 32 against the cutting insert 26 to securely hold the cutting insert 26 in the insert receiving pocket 20. The amount of force exerted by the cantilevered portion 24 can be selectively adjusted by the distance that conical clamping screw 30 is threaded into the conical thread hole 22. The greater the distance that the conical clamping screw 30 is threaded into the conical thread hole 22, the greater the force exerted by the cantilevered portion 24 against the cutting insert 26.

Figure 4:
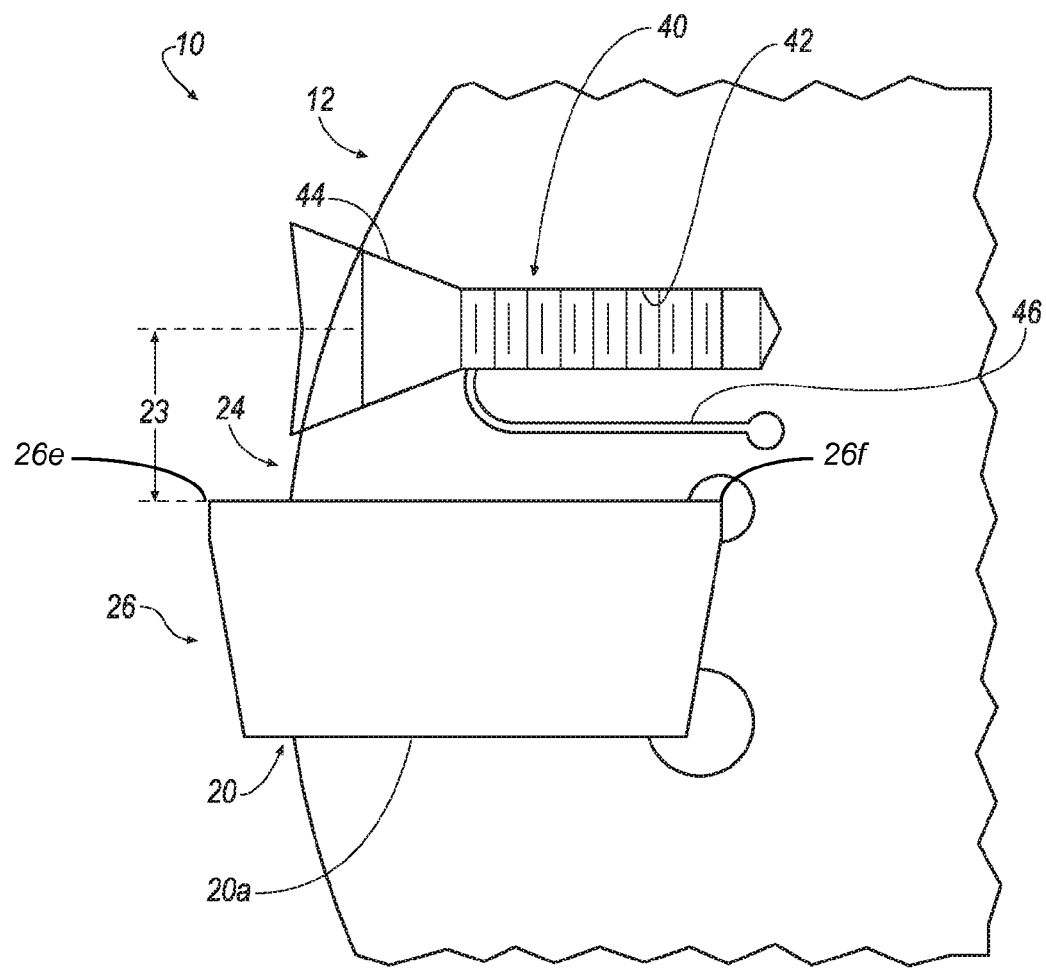
FIG. 4 is a side cross-sectional view of a clamping mechanism including a non-conical clamping screw with a tapered head portion threaded into a non-conical thread hole according to an alternate embodiment of the invention.

In the embodiment shown in FIGS. 1 and 2, each of the cutting inserts 26 is provided with cutting edge 26e, 26f (FIG. 4). Thus, each cutting insert 22 has two cutting edges 26e, 26f and these cutting edges 26e, 26f can be selectively presented to working position by unthreading the conical clamping screw 30 from the conical thread hole 22 until the cutting insert 26 is able to be removed from the insert receiving pocket 20, removing the cutting insert 26, and rotating the cutting insert 26 one-hundred eighty (180) degrees about a vertical axis, and then again clamping the cutting insert 26 in the cutter body 12.

Referring now to FIG. 4, a slotting cutter 10' is shown according to another embodiment of the invention. In this embodiment, the conical thread hole 22 and the conical clamping screw 30 of the embodiment shown in FIGS. 1-3 is replaced with a non-conical clamping screw 40 and a non-conical thread hole 42. The clamping screw 40 includes a tapered head portion 44 that contacts the cantilevered portion 24 of the cutter body 12 to cause the cantilevered portion 24 to exert a downward force against the cutting insert 26 when the clamping screw 40 is threaded into the thread hole 42. In the illustrated embodiment, the angle 23 between the thread hole 42 and the top wall 20a of its respective insert receiving pocket 20 is approximately zero. However, it will be appreciated that the angle 23 can be a positive or negative angle (i.e., the thread hole 42 can be angled upward or downward with respect to the top wall 20a). A slot 46 is formed in the cutter body 12 between the cantilevered portion 24 and the thread hole 42 to prevent unwanted movement of the cutter body 12 when the clamping screw 40 is threaded into the thread hole 42.

As described above, the slotting cutter 10 of the invention includes an insert clamping mechanism comprising the combination of the clamping screw 30, 40 threaded into a thread hole 22, 42 to cause the cantilevered portion 24 to provides a biasing force against the cutting insert 26 to securely hold the cutting insert 26 in the insert receiving pocket 20 during machining operations.

The patents and publications referred to herein are hereby incorporated by reference.

Having described presently preferred embodiments the invention may be otherwise embodied within the scope of the appended claims.

What is claimed is:

1. A slotting cutter, comprising:
    a disc-like cutter body rotatable in a predetermined direction on a central axis perpendicular to a plane of the cutter body;
    a plurality of insert receiving pockets formed about a perimeter of the body;
    a plurality of thread holes formed about the perimeter of the cutter body, each thread hole extending radially inward from the perimeter of the body toward the central axis;
    a clamping screw replaceably threaded in each thread hole of the cutter body;
    a cantilevered portion disposed between each insert receiving pocket and a respective thread hole; and
    a slot extending from the thread hole and into the cantilevered portion to prevent unwanted movement of the cutter body when the clamping screw is threaded into the thread hole, a portion of the slot extending substantially parallel to the thread hole, wherein the clamping screw causes the cantilevered portion to exert a downward force against a cutting insert when the clamping screw is threaded into the thread hole.

2. The slotting cutter according to claim 1, wherein the cantilevered portion includes a bottom surface for engaging the cutting insert.

3. The slotting cutter according to claim 2, wherein the bottom surface of the cantilevered portion is complementary in shape to a top surface of the cutting insert.

4. The slotting cutter according to claim 1, wherein each thread hole has threaded sidewalls that are formed at a taper angle with respect to each other.

5. The slotting cutter according to claim 4, wherein each sidewall is separated by a transverse slot.

6. The slotting cutter according to claim 1, wherein each insert receiving pocket further includes a first radius between the top wall and the rear wall, and a second radius between the bottom wall and the rear wall.

7. The slotting cutter according to claim 1, wherein the clamping screw includes a tapered head portion that contacts the cantilevered portion when the clamping screw is threaded into the thread hole, thereby causing the cantilevered portion to exert the downward force against the cutting insert.

8. The slotting cutter according to claim 1, wherein the clamping screw and the thread hole are conical in shape.

9. The slotting cutter according to claim 1, wherein each insert receiving pocket includes a top wall, an opposing bottom wall, and a rear wall.

10. The slotting cutter according to claim 1, wherein each thread hole is formed at an angle with respect to the top wall of its respective insert receiving pocket.

\* \* \* \* \*